(No Model.)
6 Sheets—Sheet 1.
P. G. GIROUD.
WORKMAN'S TIME RECORDER.
No. 602,845.　　　　　　　　　Patented Apr. 26, 1898.
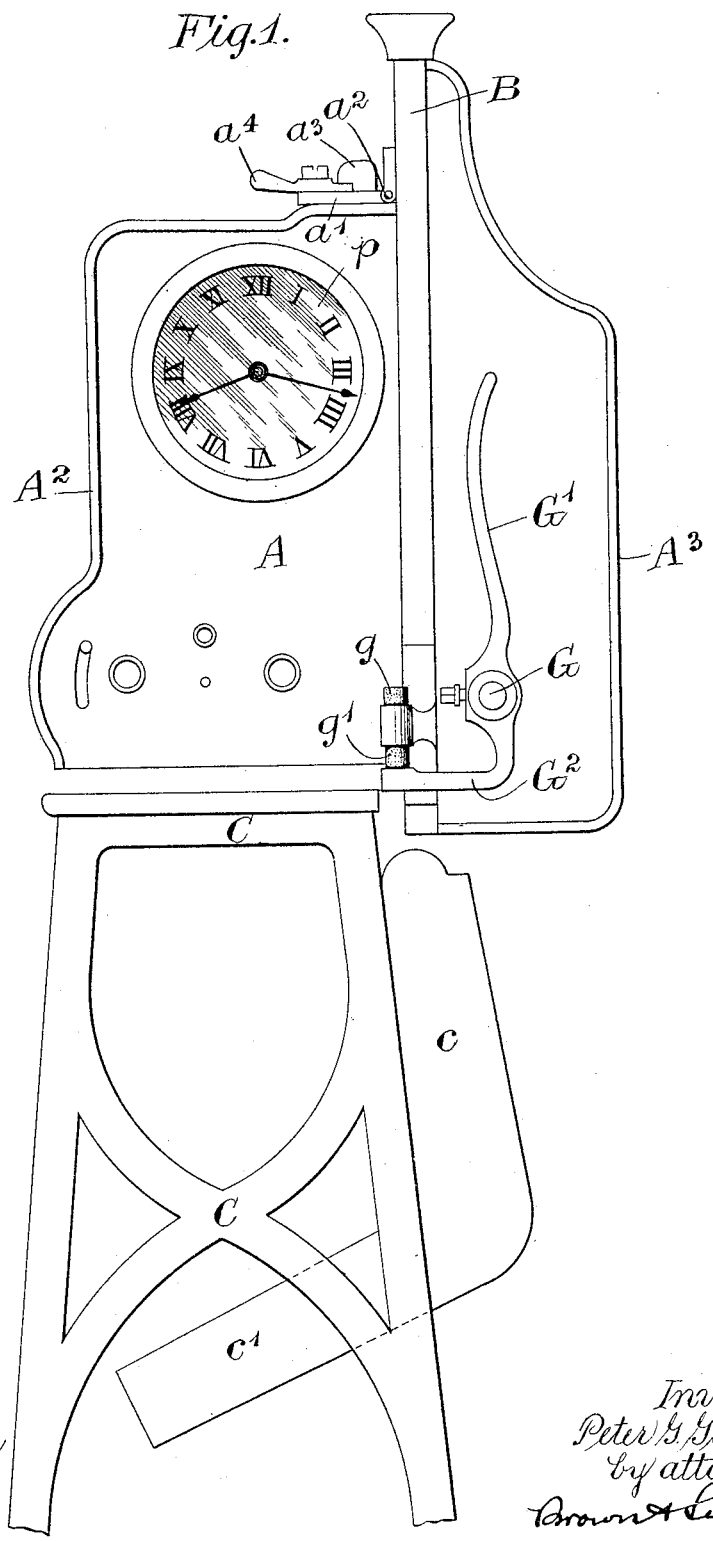
Witnesses:—
Wb. E. Fletcher
George Barry Jr.
Inventor
Peter G. Giroud
by attorneys
Brown & Seward

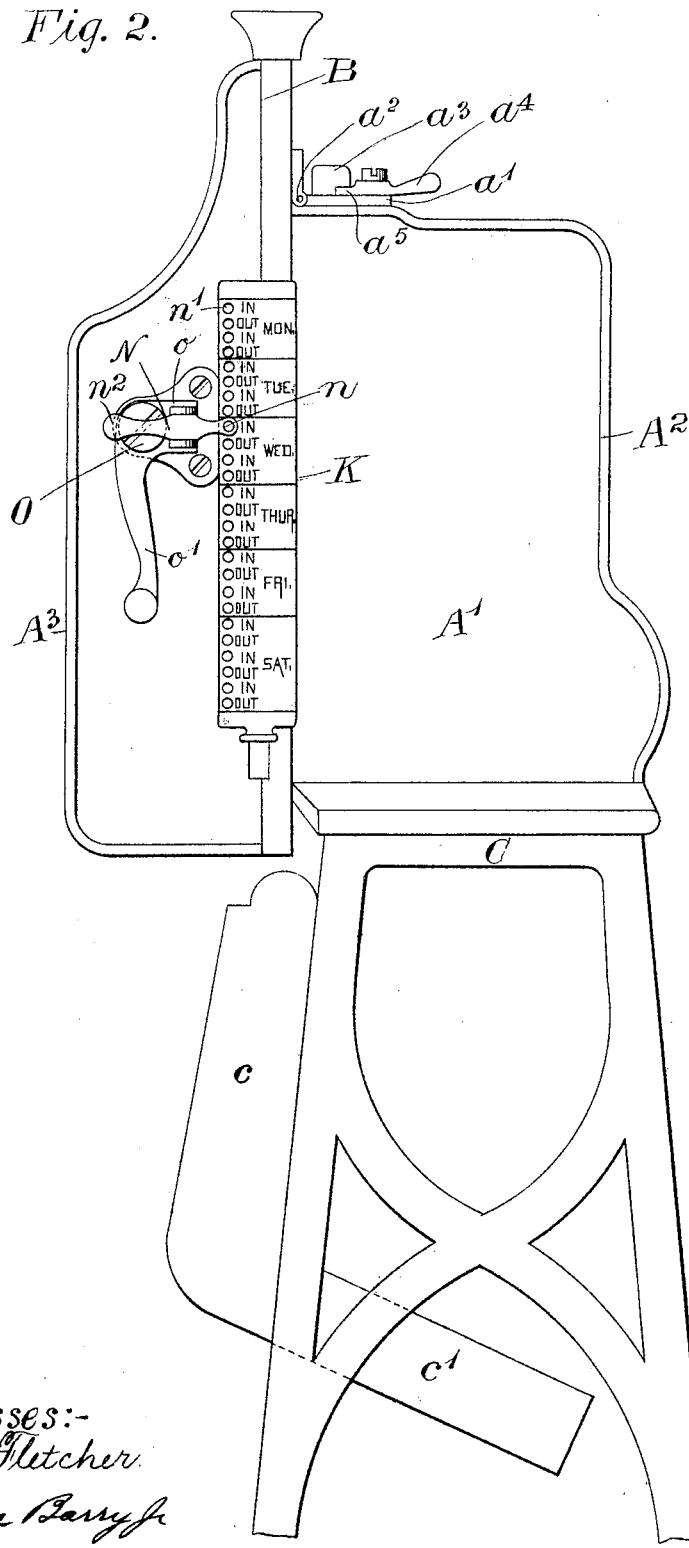

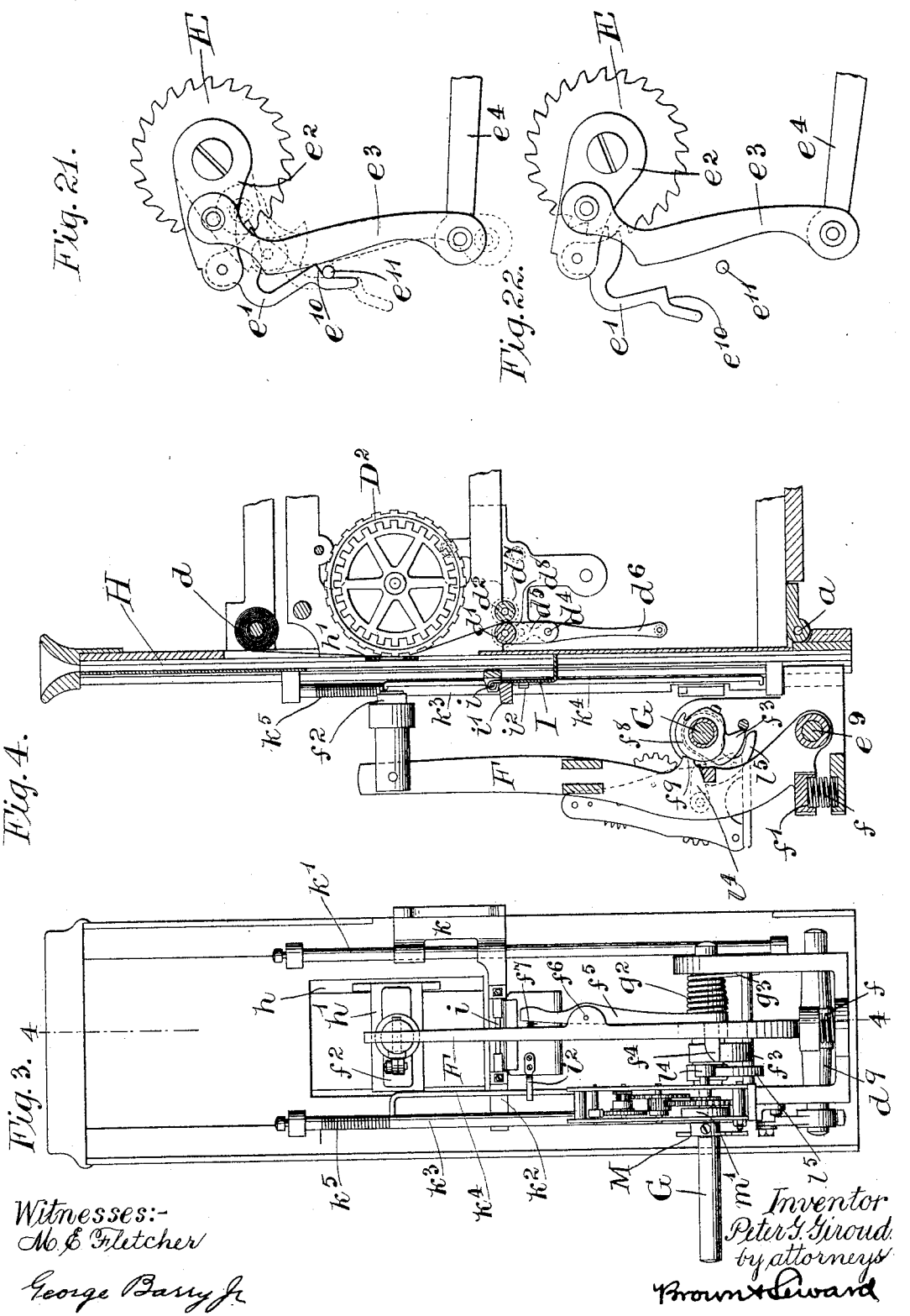

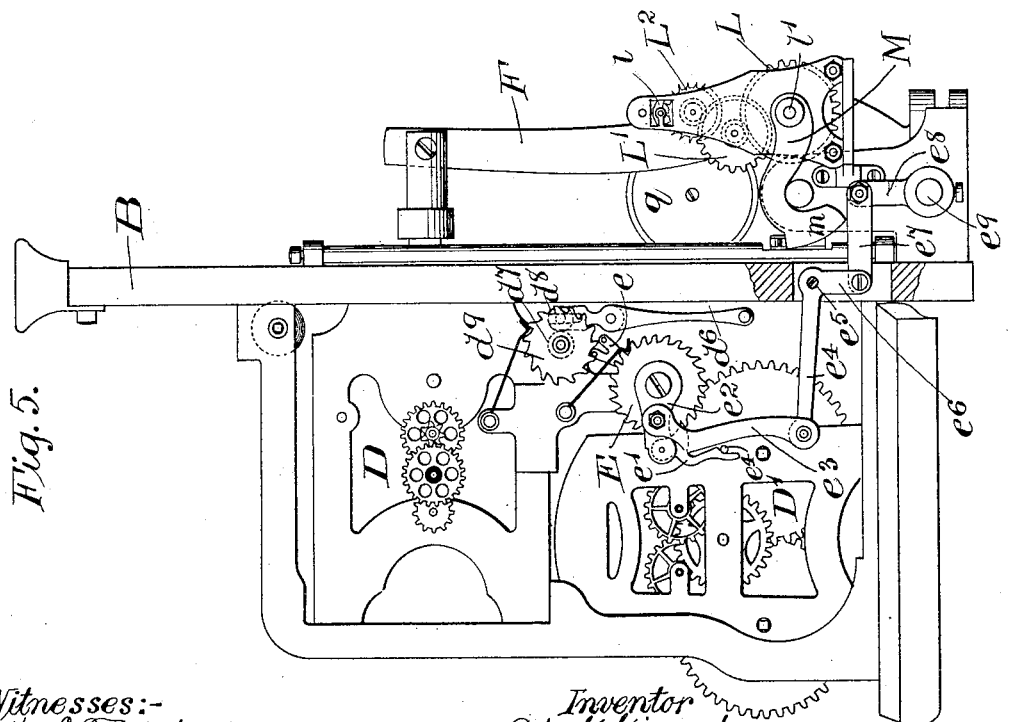

(No Model.) 6 Sheets—Sheet 5.
P. G. GIROUD.
WORKMAN'S TIME RECORDER.

No. 602,845. Patented Apr. 26, 1898.

Witnesses:—
M. E. Fletcher
George Barry Jr.

Inventor
Peter G. Giroud
by attorneys
Brown & Seward (No Model.)
6 Sheets—Sheet 6.
P. G. GIROUD.
WORKMAN'S TIME RECORDER.
No. 602,845.
Patented Apr. 26, 1898.
Fig.12. Fig.13.
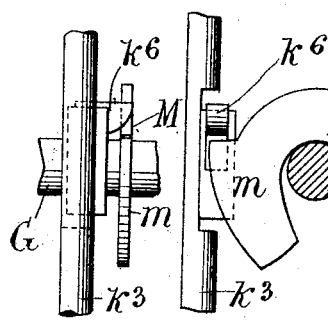
Fig.14. Fig.15.
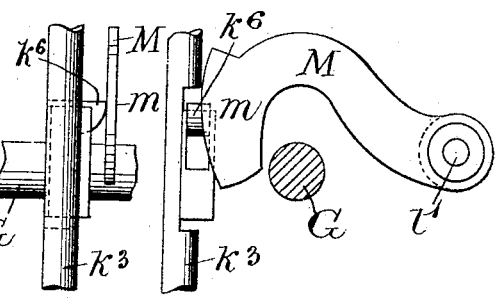
Fig.16.
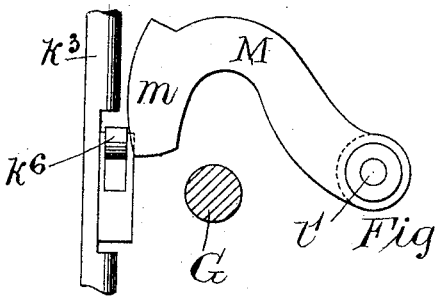
Fig.17.
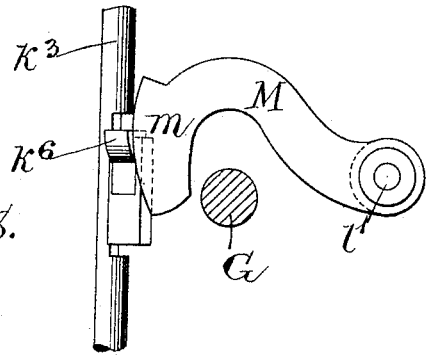
Fig.18.
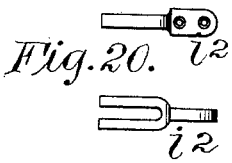
Fig.19.
Fig.20.
Witnesses:-
M. E. Fletcher
George Barry Jr.
Inventor
Peter G. Giroud
by attorneys
Brown & Seward
THE NORRIS PETERS CO., PHOTO-LITHO., WASHINGTON, D. C.

UNITED STATES PATENT OFFICE.

PETER G. GIROUD, OF NEWARK, NEW JERSEY, ASSIGNOR TO JAMES S. MacCOY, OF NEW YORK, N. Y.

WORKMAN'S TIME-RECORDER.

SPECIFICATION forming part of Letters Patent No. 602,845, dated April 26, 1898.

Application filed December 12, 1896. Serial No. 615,434. (No model.)

*To all whom it may concern:*

Be it known that I, PETER G. GIROUD, of Newark, in the county of Essex and State of New Jersey, have invented a new and useful Improvement in Workmen's Time-Recorders, of which the following is a specification.

My invention relates to an improvement in workmen's time-recorders in which provision is made for printing on a record-slip inserted in the machine by the workman in passing in or out the time of his passing.

My invention more particularly contemplates a recorder to be operated by the workman himself or some one acting for him after he has inserted his record-slip into the machine and contains provisions for insuring the discharge of the printed slip and its exposure to the view of the workman after the record has been made.

My invention also contemplates a special construction and arrangement of casings and supports for the operating parts, whereby access may be conveniently had to the several parts for regulating and renewal, and it further contemplates various features of construction and combinations of parts, as will be hereinafter more particularly pointed out.

Figure 7:
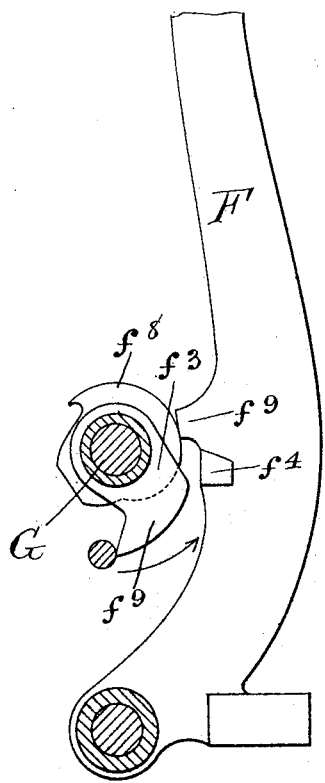
Figure 8:
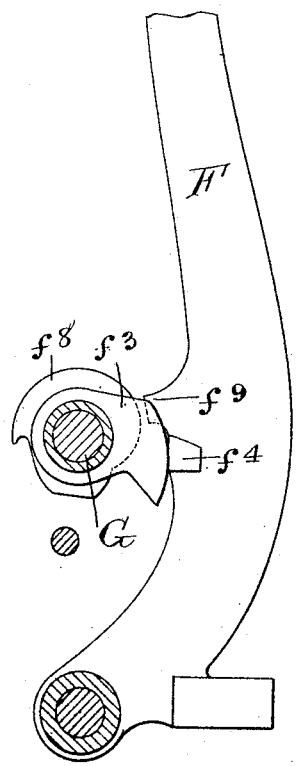
Figure 9:
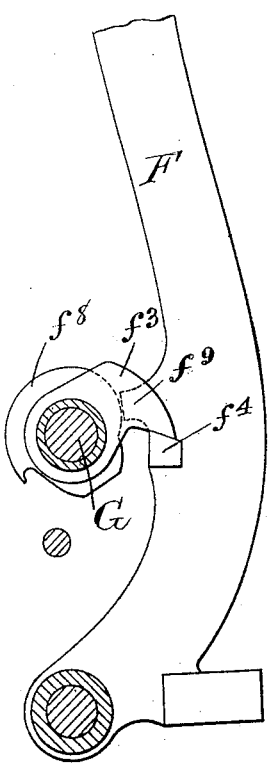
Figure 10:
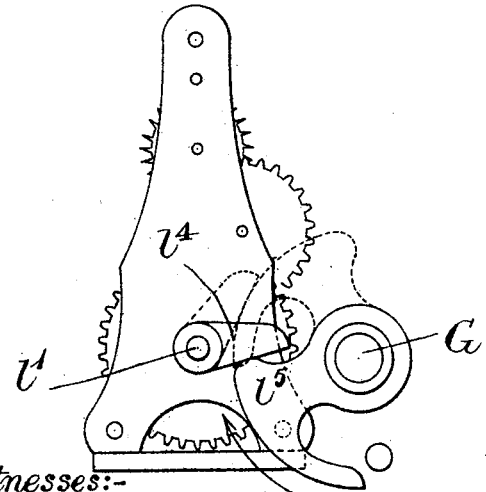
Figure 11:
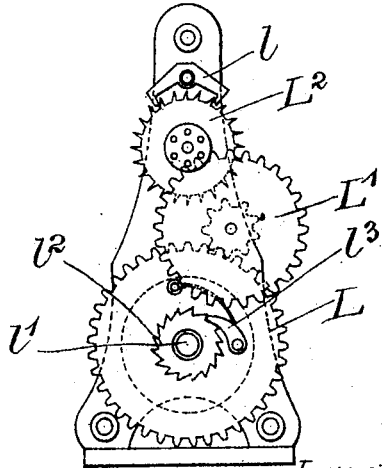

In the accompanying drawings, Figure 1 is a view of the recorder in side elevation from the side where the operating-lever is worked. Fig. 2 is a view in side elevation from the opposite side, showing the indicator-scale in operative position. Fig. 3 is a view in front elevation, on a somewhat enlarged scale, of the recorder exclusive of its pedestal, the front casing being removed to show the operative parts which coact with the time and motor trains to effect the printing and releasing of the slip and feed of the inking-ribbon. Fig. 4 is a partial vertical section from front to rear in the plane of line 4 4 of Fig. 3. Fig. 5 is a view of the operating parts in side elevation from that side on which the operating-lever is applied. Fig 6 is a view of the same from the opposite side. Figs. 7, 8, and 9 represent in detail three positions of the printing-platen lever with respect to its operating-cams. Figs. 10 and 11 represent views in detail, from opposite sides, of the clockwork for timing the release of the printed slip. Figs. 12 and 13 represent in detail end and side views, respectively, of the devices for operating the slip-retaining gate or stop, showing them in the position which they assume when the slip is inserted. Figs. 14 and 15 are similar views showing the position of the parts when the printing takes place. Fig. 16 shows a side view of the same as the gate or stop is about to be operated. Fig. 17 is a similar view showing the position of the parts when the gate or stop is full open. Fig. 18 is a view in detail of the yielding catch or abutment carried by the gate-operating rod, showing it in position on the front of the rod. Figs. 19 and 20 represent, respectively, edge and top plan views in detail of the arm which connects the gate with the handle on the gate-operating rod. Figs. 21 and 22 represent in detail different positions of the pawl and its operating arm and link with respect to the ratchet-wheel which actuates the ribbon-feeding device, and Fig. 23 represents one of the slips on which the record is printed.

The working parts of the machine are inclosed within a casing the opposite sides of which are denoted, respectively, by A and A', the front by $A^2$, and the back by $A^3$.

In using the terms "front" and "back" for the purposes of the following explanation I have considered that side of the machine on which the operator stands in working the machine to print the slip and observe the record as the front.

The back $A^3$ is, in fact, a hollow casing hinged to the front section of the casing at or near its foot, as shown at $a$, (see Fig. 4,) so as to permit it to be swung apart from the front section A', leaving exposed the mechanism for pressing the record-slip against the type-wheels and the mechanism for determining the position of the record-slip with respect to the type-wheels, which mechanisms, together with the conduit B for receiving the record-slip, are carried by the swinging casing $A^3$, and also leaving exposed the inking-ribbon, supported in position to be fed across the face of the type-wheels and mounted, together with the type-wheels and their time and motor trains, in the fixed section of the casing A and A'.

The casing as a whole is conveniently supported upon a pedestal C of suitable height, and the said pedestal C also serves as a support for a record-slip receiver comprising a more or less upright section $c$ and a more or less horizontally-inclined portion $c'$, as clearly shown in Figs. 1 and 2, for directing the record-slip after it has been printed and has escaped from the lower end of the conduit B into the more or less upright section $c$ of the receiver into the more or less horizontally-inclined section $c'$ of the receiver, with its face upward, where it may be conveniently read by the workman who deposited it in the conduit B as he passes from the machine into or out of the factory. To this end the upper side of the section $c'$ of the receiver is either left entirely or partially open or provided with a transparent cover in order to expose the printed slip resting therein.

The front $A^2$ of the casing may be made removable from the sides A and A′ and may be secured in position by the same fastening which locks the swinging section $A^3$ in its closed or operating position. This fastening consists of a swinging loop $a'$, pivoted to the swinging section $A^3$ at $a^2$ and adapted to slip over a catch $a^3$, fixed to the front section of the casing, the said loop being locked in its position by means of a horizontally-swinging latch $a^4$, pivoted to the loop $a'$ in position to have its end $a^5$ swung underneath the nose of the catch $a^3$, as clearly shown in Figs. 1 and 2.

Within the portion of the casing A and A′ there are mounted time and motor trains of gearing (represented as a whole by D and D′, respectively) connected to operate a series of type-wheels (denoted as a whole by $D^2$) for printing the minute, hour, and day of the month in a manner quite similar to that shown, described, and claimed in Letters Patent Nos. 547,426 and 547,545, granted me on the 8th day of October, 1895.

The arrangement of the time and motor trains is in the present instance, however, different from that shown in the patent in that the motor-train is arranged below the time-train for the purpose of securing a narrow and compact machine, but in other respects the structure and operation is quite like that shown and described in the patent referred to, and a particular description of the same is omitted in my present application, as my present invention relates more particularly to those parts which coact with the printing-wheels controlled by said time and motor trains for impressing the record upon the record-slip.

The inking-ribbon is fed from a supply-roll $d$, mounted in the upper rear portion of the casing A and A′, downwardly over the faces of the type-wheels $D^2$ at suitable intervals by means of feed-rollers $d'$ $d^2$, between which it passes, one of the said rollers $d'$ being mounted in elongated open slots in the opposite sides of the inner supporting-frame for the motor-train, as indicated at $d^3$, Fig. 6, and for the purpose of shifting the roller $d'$ toward and away from its companion roller $d^2$. For gripping and releasing the ribbon I provide a rock-shaft $d^4$ with forked arms $d^5$ at its opposite ends for engaging the projected ends of the axles of the roller $d'$ and attach to the rocking shaft $d^4$ an operating-lever $d^6$ for swinging the arms $d^5$, and hence the roller $d'$, away from and toward the roller $d^2$. The rollers $d'$ and $d^2$ are provided with gears (indicated in dotted lines in Figs. 4, 5, and 6) denoted, respectively, by $d^7$ $d^8$, and by means of which the rollers are simultaneously rotated when the roller $d'$ is swung into engagement with the roller $d^2$.

Motion is imparted to the rollers by means of the ratchet-wheel $d^9$, fixed to rotate with the roller $d^2$ and operated by one or more teeth $e$, projecting beyond the periphery of a ratchet-wheel E, mounted to rotate with the teeth $e$ and actuated by a gravity-pawl $e'$, carried by an arm $e^2$, loosely mounted concentric with the axis of the wheel E and operated by a connecting link or rod $e^3$, which connects the arm $e^2$ with one arm $e^4$ of an angle-lever pivotally secured at $e^5$ to one side of the front of the swinging casing-section $A^3$, the other arm $e^6$ of the angle-lever being connected by the link $e^7$ with an arm $e^8$, fixed to rock with a shaft $e^9$, mounted at the base of the swinging section $A^3$ of the casing and operated by the lever which makes the impression, as will be hereinafter more particularly described.

The lever which serves to press the record-slip toward the printing-wheels to impress the record on the slip is denoted by F. It is fixed at its lower end to rock with the shaft $e^9$ and is driven forward when left free to operate by means of an actuating-spring $f$, seated at one end in a depression at the base of the swinging section $A^3$ and at its opposite end in a depression formed in the heel of the lever F, as denoted at $f'$. At its free end the lever F is provided with a hammer or impression-platen $f^2$, so adjusted that when the lever F is forced toward the type-wheels the impression-platen $f^2$ will strike the record-slip interposed between it and the type-wheels at a point directly opposite that set of type on the type-wheels which will make the proper impression upon the slip.

The lever F is forced backwardly and suddenly released to make the impression by means of a cam $f^3$, fixed on a rocking shaft G, to which the operating-lever G′ is attached exterior to the side of the swinging section $A^3$ of the casing, as shown in Fig. 1. The forward movement of the lever G′ is determined by a yielding stop $g$, with which the operating-handle of the operating-lever G′ comes in contact when at the limit of its forward stroke, and the said lever G′ is limited in its rearward stroke by means of a stop $g'$, with which the extended bent end $G^2$ of the lever comes in contact.

The shaft G is actuated in a direction to throw it rearwardly into the position shown in Fig. 1 ready to be operated by means of a spring $g^2$, one end of which is engaged with the shaft-supporting frame, as at $g^3$, and the opposite end with the shaft itself. As the lever G' is drawn forward after the record-slip has been placed within the receiver or conduit B it rocks the shaft G and at the same time the cam $f^3$, fixed on the shaft G, thereby pressing the lever F to the rear against the tension of the spring $f$ until the nose of the cam $f^3$ disengages the lever F and permits it to move quickly forward to press the record-slip against the type.

The engagement of the cam $f^3$ with the lever F is effected through the agency of a bevel-faced dog $f^4$, carried by the end of a vibrating lever $f^5$, pivoted to the lever F at $f^6$ and actuated by a spring $f^7$, tending to hold the dog $f^4$ in position, projecting laterally from the side of the lever F, as clearly shown in Fig. 3, in position to engage the cam $f^3$ as the shaft G is rocked. As the cam $f^3$ is returned to its normal position (shown in Figs. 3 and 4) under the influence of the spring $g^2$ the cam will engage the bevel-face of the dog $f^4$ and force the dog laterally out of the way of the cam against the tension of the spring $f^7$, and as soon as the cam has passed the dog the latter will again spring laterally into the position shown in Fig. 3 ready for again pushing the lever F back, when the operating-lever G' is pulled forward. There is also fixed on the shaft G a cam $f^8$, which serves to press the lever F rearwardly as the shaft G returns under the tension of its actuated spring $g^2$. The cam $f^8$ also limits the forward movement of the lever F by the engagement of a projection or lug $f^9$ on the lever with a receding portion of the cam-face, as noted in dotted lines in Fig. 9.

The conduit for the reception of the record-slip (denoted by B) is fixed to the front of the swinging portion $a^3$ of the casing and is provided with a suitable opening opposite the impression-platen to enable the said platen to strike the record-slip and force it and the inking-ribbon against the type. The opening through which the impression-platen operates is denoted in Fig. 3 at $h$, the guard for protecting the inking-ribbon upon opposite sides of the type to be for the time being utilized being shown at $h'$.

In order to determine the distance to which the impression-slip shall be inserted within the conduit B before receiving the impression, a stop-gate I is provided, which is capable of being adjusted up and down to suit the day of the week and the particular division of the day on which the record is to be made. To enable this adjustment to be quickly and correctly made, there is provided exterior to the casing of the machine a scale, denoted as a whole by K, (see Fig. 2,) which corresponds in its subdivision to the subdivisions of the record-slip denoted by K'. The scale K is fixed to rise and fall together with the stop-gate I by means of a slide $k$, to the exterior face of which the scale K is attached, the said slide $k$ being guided by a rod $k'$, along which it travels. The lower end of the slide $k'$ is provided with a laterally-projecting arm $k^2$, which stretches across the interior of the casing $A^3$ and bears against the front of a rod $k^3$, corresponding to the guide-rod $k'$; but, unlike the guide-rod $k'$, the rod $k^3$ is mounted to rock in its bearings for the purpose of operating the stop-gate I. The stop-gate I is hung from a pintle $i$ on the back of the arm $k^2$ and is provided with a weight $i'$, projecting from the back of the gate I, which tends under the influence of gravity to hold the gate I, with its foot, across the conduit B, in position to arrest a record-slip when placed in the conduit. The rocking rod $k^3$ is provided with an arm or nose $k^4$, consisting in the present instance of a wire having its ends turned laterally toward and fixed to the rod $k^3$, while its body portions extend along and parallel with the rod $k^3$, which nose or arm engages a forked connecting-piece $i^2$, fixed to the back of the swinging gate I. The rod $k^3$ is provided with an actuating-spring $k^5$, the tension of which tends to swing the rod $k^3$ in a direction to hold the gate I closed, the said gate being positively opened when the rod $k^3$ is rocked against the tension of its actuating-spring $k^5$ to swing the operating arm or nose $k^4$ rearwardly, and with it, by means of the connecting-piece $i^2$, the gate I.

While it is desirable that the impression-platen should be promptly withdrawn from its position across the interior of the conduit B to permit the record-slip to pass promptly out of the conduit B, it is at the same time desirable that the gate I, which releases the record-slip after the impression and permits the said slip to fall under the influence of gravity into the receiver on the pedestal, should be held open a short space of time sufficient to insure the passage of the record-slip before it again assumes its closed position.

I have provided for holding the gate I open for a short space of time after the record-slip has been printed in the following manner: A simple clockwork, consisting in the present instance of three intermeshing wheels and pinions (denoted, respectively, by L, L', and $L^2$) and an escapement $l$ of ordinary form, (see Fig. 11,) is mounted in suitable supports in the swinging section $A^3$, and the arbor $l'$, on which the wheel L rotates and which carries the ratchet-pinion $l^2$ for locking the arbor $l'$ to the wheel L by means of the spring-actuating pawl $l^3$, has fixed to rock therewith a cam-headed arm M, the cam-head $m$ of which when the arm M is raised by the rocking of the arbor $l'$ will force the spring-actuated bevel-faced dog $k^6$, (see Figs. 12 and 18, inclusive,) carried by the rocking rod $k^3$, back out of its way without rocking the rod $k^3$, but on its downward or reverse movement under the tension of the clockwork-actuating spring $m'$ will, by its engagement with the face of the dog $k^6$, rock the rod $k^3$ in the direction to open the gate I. The arbor $l'$ also has fixed to rock therewith a tappet $l^4$, (see Figs. 3, 4, and 10,) in position to be engaged by a cam $l^5$, fixed to rock with the shaft G.

The arrangement of the several parts is such that when the shaft G is rocked by the pulling of the operating-lever G' forwardly the cam $l^5$ will engage the tappet $l^4$ and rock the arbor $l'$ rearwardly, the ratchet-pinion $l^2$ working in the meantime idly past the pawl $l^3$, winding the clock-spring $m'$ and lifting the cam-headed arm M into its raised position. As soon as the operating-lever G' is permitted to spring back into its normal position the clock-spring will tend to rotate the arbor $l'$ in the opposite direction and will thereby, by means of the connecting-pawl $l^3$, tend to operate the clockwork L, L', and $L^2$, which under the retarding influence of the escapement $l$ will slowly return the cam-headed arm M, thereby effecting the opening of the gate L and holding it open for a little space of time while the cam-head $m$ of the arm M is passing the spring-actuating dog $k^6$. As soon as this has taken place the rod $k^3$ will promptly rock into its normal position, closing the gate I, ready for the reception of another slip.

The scale K is held in its desired vertical adjustment by means of a spring-catch N, provided with a holding-nose $n$, adapted to engage some one of the series of perforations $n'$ in the scale which may be brought to register with it, the said catch N being so arranged that it may be released from the scale K by pressing upon its tail $n^2$. The catch N is pivoted on the short arm $o$ of a lever fulcrumed to the casing at O and provided with an operating-handle $o'$ for rocking the catch N bodily a short distance up or down sufficient to bring the scale K a single step above or below its normal position without releasing the catch N from it. This is for the purpose of temporarily adjusting the scale K to the "in" or "out" adjacent to that with which it is for the time being permanently set to take the time of a workman who may be for some reason going in the opposite direction from that in which the majority of workmen are supposed to be passing.

The operation as a whole is as follows: The scale K having been adjusted to the day of the week and that part of the day required—as, for example, to take the time of the workmen coming into the factory on Wednesday morning, as shown in Fig. 2—the gate I will by such adjustment of the scale K have been set in the proper position with respect to the conduit B to arrest the workman's record-slip at such a point as to receive the impression opposite the word "in" at the beginning of the Wednesday subdivision. The workman in passing the machine, having placed his record-slip in the conduit B with its face toward the front, takes hold of the operating-lever G' and gives it a pull forward until it is arrested by coming in contact with the stop $g$. He then permits it to fly back under the impulse of its retracting-spring, and as he passes from the machine he may or may not, as he pleases, glance at his now printed record-slip lying in the lower portion $c'$ of the receiver, with its face exposed to him, to ascertain whether or not the machine has printed the correct time, as indicated by the clock-dial P, exposed on that side of the casing on which the operating-lever G' is located. The forward pull of the operating-lever G' by rocking the shaft G pressed the lever F backwardly and permitted it to fly forward and make the impression. The same movement of the shaft G also rocked the arbor $l'$ and lifted the cam-headed arm M in position to effect a release of the printed slip. The rocking of the arbor $l'$ also wound the clock-spring $m'$ for operating the clockwork which determines the time which the arm M shall occupy in returning to its normal position, and hence the length of time which the gate I shall be held open. The rocking of the shaft G, and hence the backward movement of the lever F also, through the lever F rocks the shaft $e^9$ in the direction to depress the swinging arm $e^2$ and the pawl $e'$, carried thereby.

The parts at the beginning of the forward movement of the operating-lever G' were in the position shown in Fig. 5, and the further downward movement of the arm $e^2$ will not operate the ratchet-wheel E for the reason that the pawl $e'$ has an incline $e^{10}$ on its tail engaged with the stop $e^{11}$ on the framework, by means of which the pawl is thrown out of engagement with the ratchet-wheel E during the downward swing of the arm $e^2$ under the movement of the lever F back from its normal position preparatory to making the impression.

The rocking of the shaft $e^9$ under the backward movement of the lever F also rocks a bell-hammer Q, carried by the shaft $e^9$, away from the bell $q$, preparatory to permitting the hammer to strike the bell, when the lever F springs forwardly to make the impression.

As the operating-lever G' is permitted to spring back into its normal position the cam $f^3$ passes the dog $f^4$ idly and the cam $f^8$ forces the lever F back a distance sufficient to remove the impression-platen from the interior of the conduit B. As the lever F sprung forward when released by the cam $f^3$ to make the impression it at the same time, by rocking the shaft $e^9$, sent the bell-hammer Q into engagement with the bell and also rocked the shaft $e^9$ in the direction to lift the swinging arm $e^2$ and the pawl $e'$, carried thereby, up along the margin of the ratchet-wheel E into position to engage the wheel E for advancing it. As the lever F was forced backwardly by the cam $f^8$ into its normal position it rocked the shaft $e^9$ in the direction to swing the arm $e^2$, carrying the pawl $e'$, downwardly, and hence rotates the ratchet-wheel E and the projecting teeth $e$, carried thereby, for feeding the inking-ribbon, when the teeth $e$ shall during their rotary movement, together with the ratchet-wheel E, come into engagement with the ratchet-wheel $d^9$, which operates the feed-rollers. While the ratchet-wheel E will be rotated a step each time the lever F is thrown backwardly by the cam $f^8$, the ribbon will be fed only at such intervals as may be desired, depending upon the number of steps which the wheel E shall be permitted to rotate before bringing the extended teeth $e$ into engagement with the feed-roller-operating wheel. The action of the shaft $e^9$ is communicated to the swinging arm $e^2$, as hereinabove described, by the angle-lever pivoted at $e^5$ and the links $e^7$ and $e^3$, which connect its arms with the arm $e^8$ on the shaft $e^9$ and with the swinging arm $e^2$, respectively. As soon as the operating-handle G' was allowed to spring back the cam $f^8$ promptly released the record-slip and it was permitted to fall into position to be observed.

By the connection of the angle-lever $e^5$ with the swinging arm $e^2$, which carries the feed-operating pawl $e'$, I am enabled to swing the section $A^3$ of the casing and the several operative parts mounted therein away from the stationary section of the casing without in any manner disarranging any of the parts, since the link $e^3$ will swing upon its pivoted connection with the arm $e^2$, and if it should depress said arm it would simply throw the pawl $e'$ out of engagement with the ratchet-wheel.

The time which the gate shall be allowed to remain open may be varied at pleasure by multiplying or reducing the clockwork, as may be found desirable.

When the section $A^3$ is swung apart from the stationary section, access may be had to such of the working parts as are liable to more frequently need attention, so that the machine may be kept in perfect order without requiring the removal of screws or other fastenings and the removal of parts which so commonly require a considerable length of time.

What I claim is—

1. In combination, a conduit for the reception of a record-slip, means for automatically placing type adjacent to the conduit, a printing-hammer in position to strike the record-slip against the type, a spring for actuating the hammer, an operating-shaft, a handle for operating the shaft, a cam for raising and discharging the hammer when the handle is moving in one direction, and a cam for partially raising the hammer when the handle is moved in the opposite direction, the said cams being under the control of the operating-shaft, substantially as set forth.

2. In combination, a conduit for the reception of a record-slip, means for printing the slip, an adjustable stop for determining the position of the slip while being printed and an adjustable gage in an exposed position and connected with the said stop for adjusting the stop to its proper position with respect to the record-slip, substantially as set forth.

3. In combination, a conduit for the reception of a record-slip, means for printing the slip, a gate-stop for holding and releasing the slip, mechanism for retaining the gate open for a predetermined time, and means under the control of the printing mechanism for actuating the said gate-opening mechanism, substantially as set forth.

4. In combination, a conduit for the reception of a record-slip, means for printing the slip, a gate, a gate-opening device, a motor mechanism for actuating said gate-opening device and means under the control of the printing mechanism for actuating the motor mechanism substantially as set forth.

5. In combination, a conduit for the reception of a record-slip, a movable gate for stopping and releasing the slip, a rocking rod connected with the gate to open it, a spring for actuating the rod, a movable dog carried by the rod, a cam arranged to pass freely by said dog in one direction and engage the dog to operate the rocking rod when moved in the opposite direction, a printing mechanism, and means under the control of the printing mechanism for operating said cam, substantially as set forth.

6. In combination, a motor mechanism with an escapement, a conduit for the reception of a record-slip, a movable gate for stopping and releasing the slip, a gate-opening device, a cam under the control of the motor mechanism to operate the gate-opening device, a printing mechanism and means under the control of the printing mechanism for winding the motor mechanism when the printing mechanism is operated, substantially as set forth.

7. In combination, a conduit for the reception of a record-slip, a printing mechanism, an inking-ribbon, a ribbon-feeding device, an angle-lever located intermediate the printing mechanism and ribbon-feeding device and having one arm connected with the ribbon-feeding device and another arm connected with the printing mechanism, and means under the control of the printing mechanism for operating said lever when the printing mechanism operates, substantially as set forth.

8. In combination, a conduit for the reception of a record-slip, a printing mechanism, an inking-ribbon, a ribbon-feeding device, comprising a supply-roller, a pair of feed-rollers, means for moving one of said rollers, one adapted to be rotated by the other into and out of engagement with the other roller and means for imparting a rotary movement to the feed-rollers when the printing mechanism operates, substantially as set forth.

9. In combination, means for retaining a record-slip in position to be printed, type for making the impression, a lever for forcing the record-slip against the type, means for raising the said lever at intervals, means for feeding an inking-ribbon comprising a ratchet-wheel, a pawl and a swinging arm carrying the pawl, means for releasing the pawl from the ratchet-wheel at a predetermined point in its movement, and a connection between the lever-operating mechanism and the arm carrying the pawl whereby the pawl works idly during a portion of the lift of the operating-lever and operates its ratchet-wheel during another portion of the lift of the operating-lever, substantially as set forth.

10. In combination, a casing comprising a fixed portion and a portion hinged to swing toward and away from the fixed portion, type-wheels and their actuating mechanism mounted in the fixed portion of the casing, an inking-ribbon mounted in the fixed portion of the casing, mechanism mounted in the fixed portion of the casing for feeding the ribbon, a swinging impression-platen mounted in the hinged portion of the casing, means for operating it and a connection of such form between said platen-operating means and the mechanism for feeding the inking-ribbon that the hinged portion of the casing may be swung away from the stationary portion of the casing without disconnecting operative parts, substantially as set forth.

11. In combination, a casing comprising a stationary and a hinged section, means for locking the sections in closed adjustment, a time-train and motor-train arranged one above the other within the stationary portion of the casing, type-wheels controlled by said time and motor trains arranged at the side of the casing adjacent to the hinged section, a conduit for the reception of a record-slip carried by the hinged section, a platen-operating lever mounted in said hinged section and means for operating said lever, substantially as set forth.

PETER G. GIROUD.

Witnesses:
 FREDK. HAYNES,
 EDWARD VIESER.